United States Patent

Pineo et al.

Patent Number: 5,732,546
Date of Patent: Mar. 31, 1998

[54] TRANSIENT TURBINE OVERTEMPERATURE CONTROL

[75] Inventors: Ferderick J. Pineo, Hampton, N.H.; Thomas A. Baxter, Gibsonia, Pa.

[73] Assignee: General Electric Company, Cincinnati, Ohio

[21] Appl. No.: 686,614

[22] Filed: Jul. 19, 1996

[51] Int. Cl.$^6$ ............................................. F02C 9/28
[52] U.S. Cl. ............................. 60/39.03; 60/39.281
[58] Field of Search ......................... 60/39.03, 39.091, 60/39.281

[56] References Cited

U.S. PATENT DOCUMENTS

| | | | |
|---|---|---|---|
| 3,882,672 | 5/1975 | Bauerfeind | 60/39.281 |
| 4,470,118 | 9/1984 | Morrison | 60/39.281 |
| 4,490,791 | 12/1984 | Morrison | 364/431 |
| 4,581,889 | 4/1986 | Carpenter et al. | 60/204 |
| 4,593,523 | 6/1986 | Hawes | 60/39.281 |
| 4,815,928 | 3/1989 | Pineo et al. | 415/17 |

OTHER PUBLICATIONS

General Electric, "Aircraft Gas Turbine Guide," Apr. 1972, pp.: cover, back, 1-39 to 1-49.
Traeger, "Aircraft Gas Turbine Engine Technology," 1979, pp.: cover, i, ii, 211-215 and 228-232.
GE Aircraft Engines, "F414-GE-400, Low Rate Production I," Proposal 95-RNM-25, 31 Mar. 95, cover only.
GE Aircraft Engines, "F414-GE-400, Preliminary Flight Qualification Test Phase," R95AEB004, 24 Jul. 95, cover and p. 2, and 21 Jul. 95 cover letter.

Primary Examiner—Louis J. Casaregola
Attorney, Agent, or Firm—Andrew C. Hess; Wayne O. Traynham

[57] ABSTRACT

A gas turbine engine includes a compressor joined to a turbine by a core rotor, with a combustor disposed therebetween for receiving compressed air from the compressor and fuel through a valve for producing combustion gas discharged to the turbine. A speed sensor measures speed of the core rotor, and a pressure sensor measures pressure at an inlet to the compressor. A controller is operatively joined to the sensors and the fuel valve and is configured for limiting fuel flow to the combustor in response to core acceleration rate and compressor inlet pressure to limit transient temperature of the combustor discharge combustion gas.

12 Claims, 2 Drawing Sheets

TRANSIENT TURBINE
OVERTEMPERATURE CONTROL

The U.S. Government has rights in this invention in accordance with Contract No. N00019-92-C-0149 awarded by the Department of Navy.

BACKGROUND OF THE INVENTION

The present invention relates generally to gas turbine engines, and, more specifically, to controlling transient turbine overtemperature therein.

A gas turbine engine includes a core having a compressor fixedly joined to a turbine by a core rotor extending axially therebetween. An annular combustor is disposed between the compressor and the turbine and includes fuel injectors joined to a fuel control valve which meters fuel into the combustor during operation.

The compressor includes one or more stages of circumferentially spaced apart compressor rotor blades and cooperating compressor stator vanes through which air is channeled during operation for increasing the pressure thereof. The pressurized air is discharged from the compressor and mixed with fuel in the combustor and suitably ignited for generating hot combustion gas which flows downstream therefrom and through the turbine. The turbine includes one or more stages of turbine rotor blades circumferentially spaced apart from each other, with cooperating turbine nozzle vanes for expanding the combustion gas and extracting energy therefrom.

The engine also includes a suitable controller for controlling the various components thereof over a large range of rotor speed and output power. For example, the compressor must be suitably controlled for avoiding undesirable compressor stall or surge. And, fuel flow to the combustor must also be suitably controlled for not only controlling output power, but also preventing overtemperature of the turbine which would reduce its useful life.

In a dual spool or rotor engine, an additional low pressure compressor typically known as a fan is disposed upstream of the primary compressor, known as a high pressure compressor, and is fixedly joined to a low pressure turbine disposed downstream of the primary turbine, known as the high pressure turbine, using a second rotor extending coaxially through the core engine. The engine may also include an afterburner having a variable area exhaust nozzle for providing additional thrust when desired. These various engine components are functionally interrelated which complicates the control thereof.

In particular, limiting transient turbine overtemperature is desired for ensuring a suitable useful life of the turbine which is subjected to the hottest temperatures from the combustor. Typically, the temperature of the combustion gas leaving the combustor and entering the high pressure turbine is not directly controlled because measurement of the extremely high temperature thereof is difficult and impractical. Combustor exit temperature, also referred to as turbine inlet temperature, is typically controlled by limiting combustor fuel flow, scheduling area of the exhaust nozzle, and/or controlling temperature of the combustion gas downstream of one or more turbine stages after energy has been extracted therefrom and the gas temperature is correspondingly reduced to a suitable low level which may be practically measured.

These control methods require analytical correlations between the specific controlled parameter and the temperature of the gas leaving the combustor. These correlations are typically based on steady state relationships which fail to include transient operation of the engine.

In order to prevent transient temperature overshoot from damaging the turbine, suitable margins are applied to the correlation to ensure that maximum desired temperature of the combustion gas entering the turbine is not exceeded during the transient operation of the engine. This necessarily also results in degraded temperature and thrust during steady state operation which results in less than optimum performance of the engine for ensuring a suitable useful life of the high temperature turbine.

SUMMARY OF THE INVENTION

A gas turbine engine includes a compressor joined to a turbine by a core rotor, with a combustor disposed therebetween for receiving compressed air from the compressor and fuel through a valve for producing combustion gas discharged to the turbine. A speed sensor measures speed of the core rotor, and a pressure sensor measures pressure at an inlet to the compressor. A controller is operatively joined to the sensors and the fuel valve and is configured for limiting fuel flow to the combustor in response to core acceleration rate and compressor inlet pressure to limit transient temperature of the combustor discharge combustion gas.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
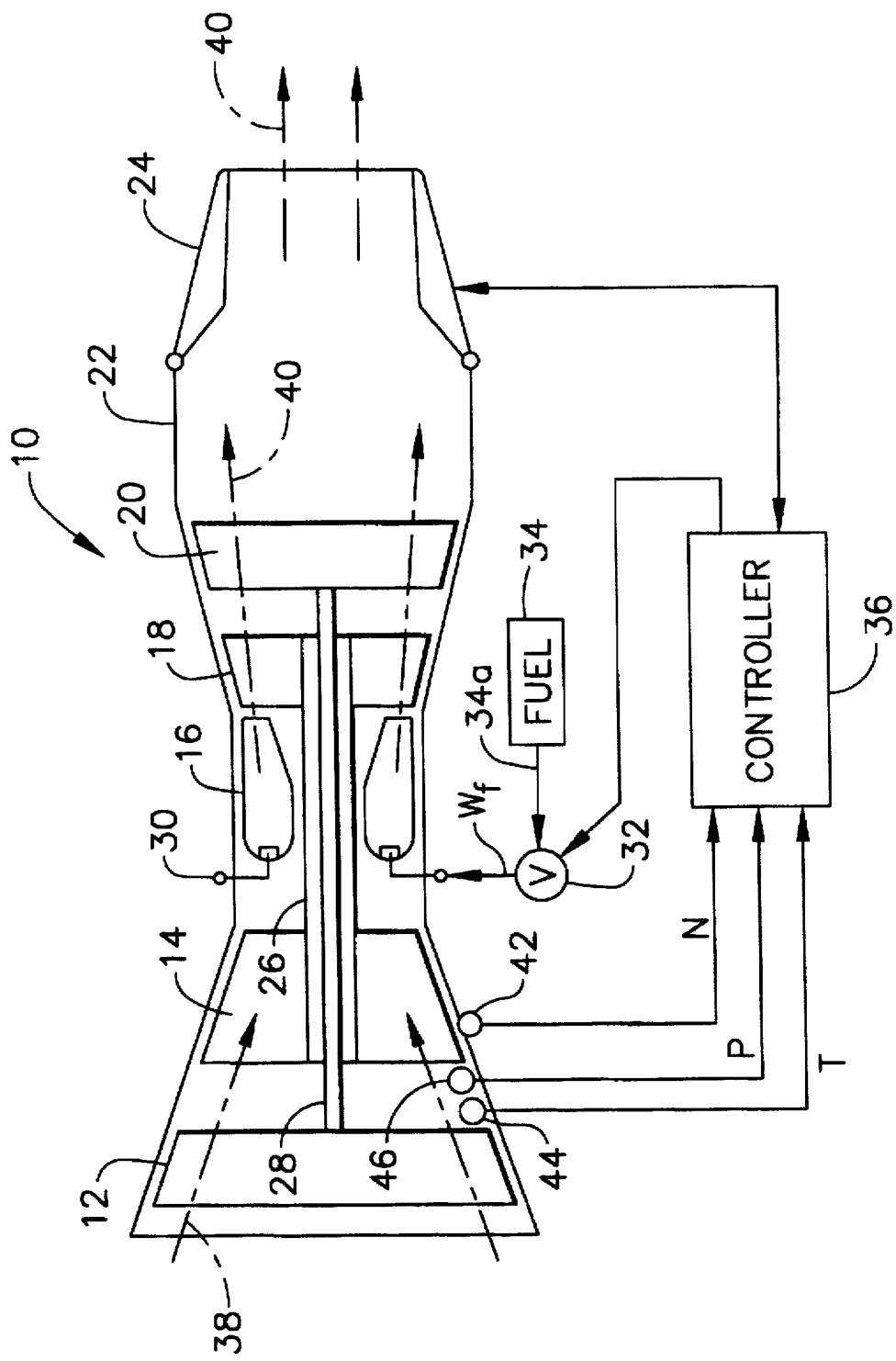
FIG. 1 is a schematic representation of an exemplary gas turbine engine including a controller configured in accordance with the present invention for limiting transient turbine overtemperature.

Illustrated schematically in FIG. 1 is an exemplary aircraft gas turbine engine 10 configured in accordance with an exemplary embodiment of the present invention. The engine 10 includes in serial flow communication a plurality of conventional components including a fan or low pressure compressor 12; a high pressure compressor 14; an annular combustor 16; a high pressure turbine 18 which may be a single stage for example; a low pressure turbine 20 which may also be a single stage, for example; an afterburner or augmenter 22 including separate fuel injectors (not shown), and a cooperating variable area exhaust nozzle 24.

The fan 12, compressor 14, high pressure turbine 18, and low pressure turbine 20 each include respective rows of circumferentially spaced apart rotor blades and cooperating stator vanes or nozzles in a conventional configuration and cooperation. The high pressure turbine 18 is fixedly joined to the high pressure compressor 14 by a core shaft or rotor 26. And, the low pressure turbine 20 is fixedly joined to the fan 12 by a corresponding fan shaft or rotor 28.

A plurality of conventional fuel injectors 30 are mounted around the upstream inlet end of the combustor 16 and disposed in flow communication with a conventional fuel control valve 32. The valve 32 is suitably joined to a fuel tank 34 which contains fuel 34a which is suitably pressurized and provided to the valve 32 for metered flow therethrough to the injectors 30.

The engine 10 also includes a digitally programmable controller 36 which may take any conventional form, and is suitably electrically joined to the fuel valve 32 for controlling operation thereof and metering the fuel flow, designated $W_f$, into the combustor 16.

In normal operation, air 38 enters the fan 12 and is pressurized through the compressor 14, mixed with the fuel 34a in the combustor 16 and suitably ignited for generating hot combustion gas 40 which is discharged from the combustor 16 and enters the high pressure turbine 18, which extracts energy therefrom for powering the compressor 14. The combustion gas 40 in turn flows downstream through the low pressure turbine 20 which extracts additional energy therefrom for powering the fan 12. When desired, additional fuel may be introduced and ignited in the afterburner 12 for augmenting thrust from the engine 10, with the variable area exhaust nozzle 24 being suitably operatively joined to the controller 36 for varying the exhaust area thereof for use in controlling the engine 10 in a conventional manner.

Various sensors are used in the engine 10 and operatively joined to the controller 36 for controlling operation of the engine 10 in a conventional manner. For example, the engine 10 additionally includes a conventional core speed sensor 42 adjoining the core rotor 26 at any convenient location such as at the radially outer tips of the rotor blades of the compressor 14 for measuring rotational speed, designated N, of the core rotor 26 during operation. The speed sensor 42 provides a suitable electrical signal representative of core speed for use in the controller 36.

The core speed N is an actual speed, and it is conventional to correct the speed in the controller 36 for use in controlling the engine. Corrected core speed is typically accomplished by using a temperature sensor 44 suitably mounted between the fan 12 and the compressor 14 for measuring the temperature of the air 38 entering the high pressure compressor 14 and providing a corresponding electrical signal to the controller 36. The core speed N is typically corrected by dividing it by the square root of the compressor inlet temperature.

The engine 10 as just described is conventional in structure, function, and operation. In order to limit the temperature of the combustion gas 40 discharged from the combustor 16 and entering the high pressure turbine 18, conventional practice is to limit the combustor fuel flow $W_f$, suitably schedule the exhaust area of the nozzle 24, and/or control temperature of the combustion gas 40 downstream of one or more of the turbine stages after energy has been extracted therefrom and the gas temperature is suitably reduced. As indicated above, however, a suitable margin must be introduced in the controller to prevent transient temperature overshoot which could undesirably reduce the useful life of the turbine 18. The resulting margin necessarily causes the engine to operate with lower maximum steady-state combustor exit temperature than optimum, which reduces thrust and efficiency of operation of the engine.

In accordance with the present invention a new control method for limiting transient turbine overtemperature has been discovered end analytically proved through a series of thermodynamic relationships representing performance of the engine 10. This analysis has uncovered a relatively simple relationship between certain operating parameters of the engine 10 which may be readily incorporated in the controller 36 to limit transient turbine overtemperature. This is accomplished by limiting the fuel flow $W_f$ into the combustor 16 in response to core acceleration rate, designated $\dot{N}$ or $dN/dt$, of the core rotor 26, and inlet pressure P of inlet air entering the high pressure compressor 14 to limit transient temperature of the combustion gas 40 discharged from the combustor 16 into the high pressure turbine 18.

Analysis based on the thermodynamic relationships mentioned above establishes that a schedule of the ratio of core acceleration rate over compressor inlet pressure as a function of core speed provides a constant combustor exit gas temperature. For a specific gas turbine engine, this schedule may be readily developed knowing the maximum allowable transient temperature capability of the high pressure turbine 18. Depending upon the material of the turbine 18 and its operating speed and power requirement, maximum allowable temperature thereof may be determined over the operating range of the engine for establishing a specific useful life thereof.

In order to implement the invention, a conventional pressure sensor 46 as shown in FIG. 1 is suitably positioned to adjoin an inlet of the high pressure compressor 14 for measuring the inlet pressure P of the compressor inlet air. The measured pressure may either be static or total as desired. The controller 36 is operatively joined to both the speed sensor 42 and the pressure sensor 46, as well as to the fuel valve 32, and is configured in accordance with the present invention for limiting the acceleration of the core rotor 26 to limit transient turbine overtemperature of the combustion gas 40 entering the high pressure turbine 18.

Figure 2:
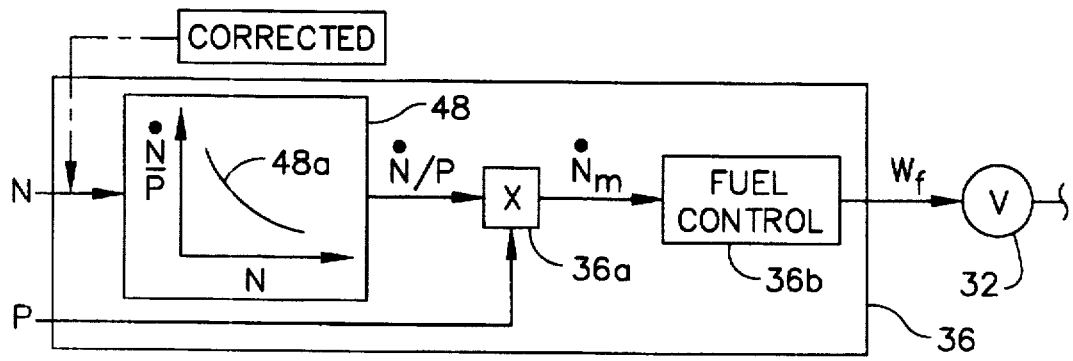
FIG. 2 is a schematic representation of a transient turbine overtemperature limiter configured in the controller illustrated in FIG. 1 for limiting fuel flow through the valve to the combustor.

Since the controller 36 is preferably digitally programmable, the invention may be simply incorporated therein by providing suitable software for the controlling parameters. FIG. 2 illustrates schematically the functional operation of the controlling software in the controller 36, and FIG. 3 illustrates in flowchart form an exemplary method of controlling the engine 10 to limit transient turbine overtemperature in accordance with the present invention.

Figure 3:
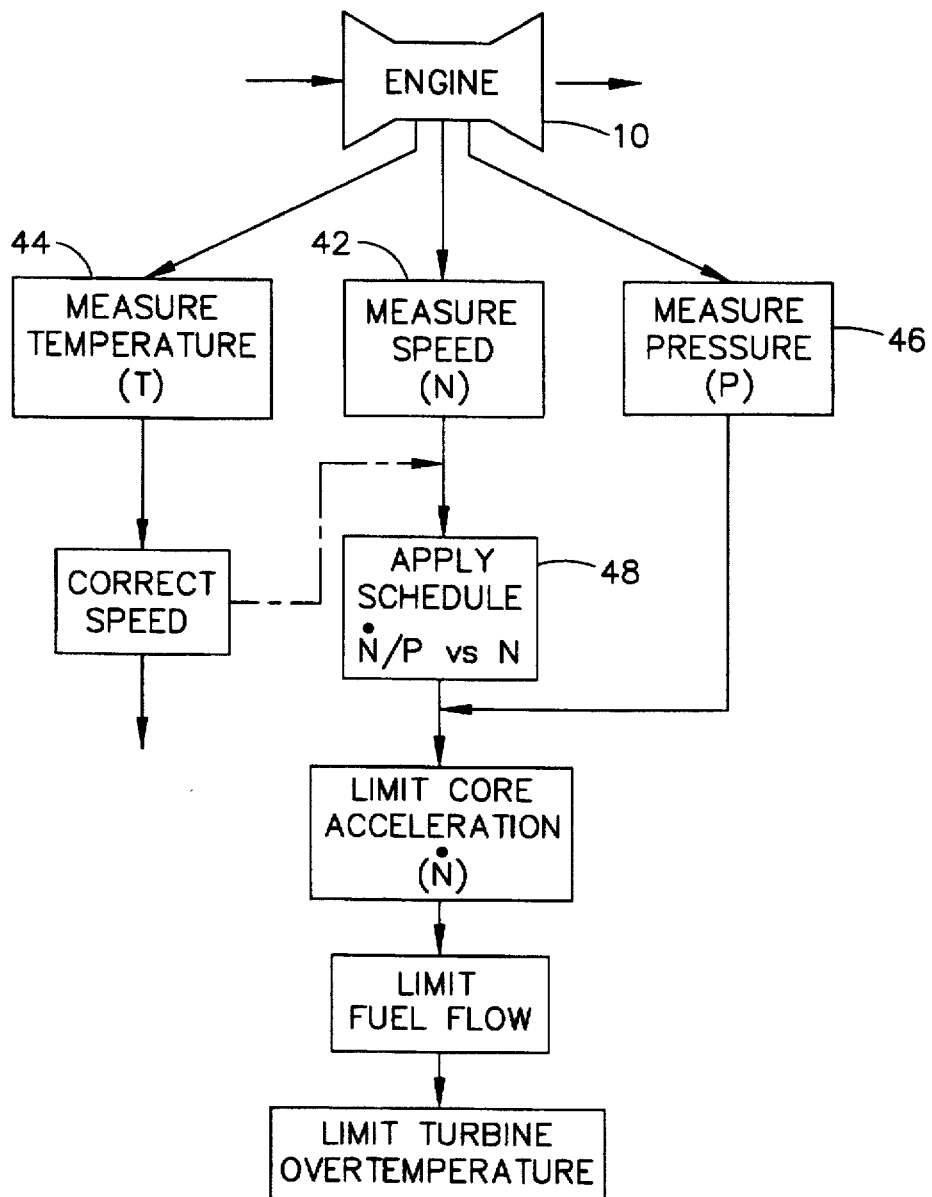
FIG. 3 is a flowchart representation of an exemplary method of implementing transient turbine overtemperature control in the engine illustrated in FIG. 1.

As shown in FIG. 3, the method starts by measuring the core speed N and compressor inlet pressure P using the sensors 42 and 46 provided therefor. The speed and pressure signals are suitably communicated to the controller 36 which is configured specifically for including a predetermined transient turbine overtemperature schedule 48 illustrated in FIG. 2 which is suitably stored in conventional memory. The schedule 48 includes a predetermined locus or curve 48a representing the maximum ratio $\dot{N}/P$ as a function of measured core speed N. As indicated above, this schedule 48 may be readily developed by those skilled in the art knowing the operating parameters of the specific engine including the temperature capabilities of the turbine materials for limiting the transient temperature of the combustion gas 40 therebelow.

The electrical signal representing the measured core speed N is provided to the schedule 48 for comparing the measured speed N with the specific schedule curve 48a to obtain therefrom a limiting or maximum value of the $\dot{N}/P$ ratio. The electrical signal representing the measured compressor inlet pressure P is suitably provided to the controller 36, and the product thereof with the output of the schedule 48 is obtained in a conventional multiplier 36a to obtain a limiting or maximum value of the core acceleration designated $\dot{N}_m$. The core acceleration parameter $\dot{N}$ is commonly used in conventional controller and now may be specifically limited using the schedule 48 for limiting transient turbine overtemperature.

Accordingly, the limiting core acceleration $\dot{N}_m$ may be suitably provided to a conventional fuel control portion 36b of the controller 36 specifically configured for controlling the fuel flow $W_f$ through the metering fuel valve 32 associated therewith. The fuel control 36b may be used for limiting the fuel flow $W_f$ to prevent the core rotor 26 from exceeding the limiting core acceleration rate $\dot{N}_m$, which in accordance with the invention and the schedule 48 correspondingly limits transient turbine overtemperature of the combustion gas 40 entering the turbine 18.

As indicated above, the thermodynamic relationships analyzed prove the efficacy of using the relatively simple ratio of core acceleration rate over compressor inlet pressure N/P for directly limiting transient turbine overtemperature. The schedule 48 defines predetermined maximum allowable temperatures of the combustion gas 40 at the inlet to the high pressure turbine 18, as represented by the curve 48a, which extends over the entire operating range of core rotor speed N.

Accordingly, at any specific value of core speed N, the corresponding value of the ratio N/P is provided and is used in the fuel control 36b for limiting fuel flow to thereby prevent exceeding the maximum scheduled temperature of the combustion gas 40 entering the turbine 18.

In practice, the control system for the engine 10 incorporated in the controller 36 may have several different modes of operation. For example, the controller 36 may be conventionally configured for limiting acceleration fuel flow to provide a desired acceleration time, or to maintain a suitable compressor stall or surge margin. Since core acceleration rate $\dot{N}$ is a common control parameter, it may be used in all conventional manners as long as its value is below the limit established by the schedule 48. When required during specific transient operation of the engine 10, this schedule 48 will intervene to limit fuel flow when the scheduled core acceleration rate is reached at corresponding values of core speed to thereby limit the combustor exit gas temperature as it approaches the maximum allowed level thereof.

In the preferred embodiment illustrated in FIGS. 2 and 3, the core rotor speed N and acceleration rate $\dot{N}$ are preferably actual values uncorrected by temperature of the compressor inlet air. It is conventional to correct core speed N as indicated above by dividing the measured core speed by the square root of the measured compressor inlet temperature T. If desired, however, the core rotor speed N, and in turn the core acceleration rate $\dot{N}$, may be so corrected by using the compressor inlet air temperature T which is shown in phantom line in FIGS. 2 and 3.

The measured temperature T of the compressor inlet temperature may therefore be suitably introduced into the schedule 48. The use of corrected or uncorrected core rotor speed may be used wherever desirable for improving the accuracy of control of the combustor exit gas temperature depending upon specific engine designs.

Although the invention is disclosed with respect to a specific two-spool engine, it may be used in any type of engine having a core engine in which transient turbine overtemperature protection is desired. This includes single or multiple spool engines, turbojets, turbofans, afterburning or non-afterburning engines, axial or centrifugal compressor engines, or axi-centrifugal compressor engines.

Since the schedule 48 controls fuel flow based on core acceleration rate, fuel limiting is only provided for non-zero values thereof which means the fuel flow is effected by the invention only during transient operation of the core rotor 26 and not during steady state operation thereof at relatively constant speed. In this way, combustor exit gas temperature is limited without compromising steady state control performance.

Combustor exit gas temperature is also limited without direct measurements thereof, thusly avoiding the increased cost and complexity associated therewith due to the use of the relatively simple algorithm which implements the present invention. The invention, therefore, provides transient limits of combustor exit gas temperature which is impossible with conventional methods derived from steady state relationships. And, the invention accurately limits transient temperature overshoots, and in turn allows a reduction or elimination of conventional margins used in transient temperature overshoot control. The engine 10, therefore, may now be operated at higher combustor exit temperature during steady state operation for correspondingly increasing engine thrust and improving overall efficiency of the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method of limiting transient turbine overtemperature in a gas turbine engine having a compressor joined to a turbine by a core rotor, with a combustor disposed therebetween for receiving compressed air from said compressor and fuel through a valve for producing combustion gas discharged to said turbine, comprising limiting fuel flow to said combustor in response to a ratio of core acceleration of said core rotor and inlet pressure of inlet air entering said compressor to limit transient temperature of said combustion gas discharged from said combustor into said turbine.

2. A method according to claim 1 further comprising:
measuring speed of said core rotor;
measuring pressure of said compressor inlet air;
comparing said measured speed with a schedule of said ratio of said core acceleration and said compressor inlet pressure versus said rotor speed to obtain therefrom a limiting value of said ratio;
multiplying said limiting ratio and said measured pressure to obtain a limiting value of said core acceleration; and
limiting said fuel flow to prevent said core rotor from exceeding said limiting core acceleration.

3. A method according to claim 2 wherein said schedule defines maximum allowable temperatures of said combustion gas over an entire range of operation of said rotor speed, and said limiting acceleration is selected to limit said fuel flow to prevent exceeding said maximum temperatures.

4. A method according to claim 3 wherein said core rotor speed and acceleration are uncorrected by temperature of said compressor inlet air.

5. A method according to claim 3 wherein said core rotor speed and acceleration rate are corrected by temperature of said compressor inlet air.

6. A method according to claim 3 wherein said limiting core acceleration affects said fuel flow only during transient operation of said core rotor and not during steady state operation thereof.

7. A gas turbine engine comprising:

a compressor joined to a turbine by a core rotor;

a combustor disposed between said compressor and turbine for receiving compressed air from said compressor and fuel through a valve for producing combustion gas discharged to said turbine;

means for limiting fuel flow to said combustor in response to a ratio of acceleration of said core rotor and inlet pressure of inlet air entering said compressor to limit transient temperature of said combustion gas discharged from said combustor into said turbine.

8. An engine according to claim 7 further comprising:

a speed sensor adjoining said core rotor for measuring speed of said rotor;

a pressure sensor adjoining an inlet of said compressor for measuring pressure of said compressor inlet air; and wherein said limiting means comprises a programmable controller operatively joined to said speed and pressure sensors and fuel valve, and is configured for:

comparing said measured speed with a schedule of said ratio of said core acceleration and said compressor inlet pressure versus said rotor speed to obtain therefrom a limiting value of said ratio;

multiplying said limiting ratio and said measured pressure to obtain a limiting value of said core acceleration; and limiting said fuel flow to prevent said rotor from exceeding said limiting core acceleration.

9. An engine according to claim 8 wherein said schedule defines maximum allowable temperatures of said combustion gas over an entire range of operation of said rotor speed, and said limiting acceleration is selected to limit said fuel flow to prevent exceeding said maximum temperatures.

10. An engine according to claim 9 wherein said core rotor speed and acceleration are uncorrected by temperature of said compressor inlet air.

11. An engine according to claim 9 wherein said core rotor speed and acceleration are corrected by temperature of said compressor inlet air.

12. An engine according to claim 9 wherein said limiting core acceleration affects said fuel flow only during transient operation of said core rotor and not during steady state operation thereof.

* * * * *

UNITED STATES PATENT AND TRADEMARK OFFICE
CERTIFICATE OF CORRECTION

PATENT NO. : 5,732,546

DATED : March 31, 1998

INVENTOR(S) : FREDERICK J. PINEO, et al.

It is certified that error appears in the above-identified patent and that said Letters Patent is hereby corrected as shown below:

COVER PAGE: item [75]

Inventors: Delete "Ferderick J. Pineo" and insert therefor "Frederick J. Pineo"

Signed and Sealed this

Thirteenth Day of October 1998

*Attest:*

BRUCE LEHMAN

*Attesting Officer*   *Commissioner of Patents and Trademarks*